United States Patent
Fiatal et al.

(10) Patent No.: US 7,139,565 B2
(45) Date of Patent: Nov. 21, 2006

(54) CONNECTION ARCHITECTURE FOR A MOBILE NETWORK

(75) Inventors: Trevor A. Fiatal, Fremont, CA (US); Lee R. Boynton, Lake Oswego, OR (US); Scott M. Burke, Mountain View, CA (US); Brian D. Gustafson, Montara, CA (US); Binu Raj, Fremont, CA (US); William Alvarado, Menlo Park, CA (US); Juan Benitez, San Jose, CA (US); Fred J. Duncan, San Francisco, CA (US)

(73) Assignee: Seven Networks, Inc., Redwood City, CA (US)

( * ) Notice: Subject to any disclaimer, the term of this patent is extended or adjusted under 35 U.S.C. 154(b) by 322 days.

(21) Appl. No.: 10/339,368

(22) Filed: Jan. 8, 2003

(65) Prior Publication Data

US 2003/0157947 A1  Aug. 21, 2003

(51) Int. Cl.
    *H04Q 7/20* (2006.01)
(52) U.S. Cl. .................. 455/423; 455/424; 455/425; 455/550.1; 455/426
(58) Field of Classification Search ............. 455/550.1, 455/426
    See application file for complete search history.

(56) References Cited

U.S. PATENT DOCUMENTS

| | | |
|---|---|---|
| 4,831,582 A | 5/1989 | Miller et al. |
| 4,875,159 A | 10/1989 | Cary et al. |
| 4,897,781 A | 1/1990 | Chang et al. |
| 5,263,157 A | 11/1993 | Janis |
| 5,386,564 A | 1/1995 | Shearer et al. |
| 5,392,390 A | 2/1995 | Crozier |
| 5,572,643 A | 11/1996 | Judson |
| 5,581,749 A | 12/1996 | Hossain et al. |
| 5,600,834 A | 2/1997 | Howard |
| 5,613,012 A | 3/1997 | Hoffman et al. |
| 5,623,601 A | 4/1997 | Vu |
| 5,627,658 A | 5/1997 | Connors et al. |
| 5,630,081 A | 5/1997 | Rybicki et al. |
| 5,634,053 A | 5/1997 | Noble et al. |
| 5,647,002 A | 7/1997 | Brunson |
| 5,652,884 A | 7/1997 | Palevich |

(Continued)

FOREIGN PATENT DOCUMENTS

WO    WO 98/24257    6/1998

(Continued)

OTHER PUBLICATIONS

Lotus Development Corporation, *Lotus Quick Reference for SmartIcons, Lotus Notes Release 3.1*, Date unknown.

(Continued)

*Primary Examiner*—Lester G. Kincaid
*Assistant Examiner*—Fred A. Casca
(74) *Attorney, Agent, or Firm*—Marger Johnson & McCollum, P.C.

(57) ABSTRACT

A real-time communication architecture establishes a continuous connection between an enterprise network and a communication management system. The connection is continuously held open allowing mobile devices real-time access to enterprise email systems. The real-time communication architecture can support an entire enterprise email system or individual email users. The foregoing and other objects, features and advantages of the invention will become more readily apparent from the following detailed description of a preferred embodiment of the invention which proceeds with reference to the accompanying drawings.

55 Claims, 6 Drawing Sheets

U.S. PATENT DOCUMENTS

| | | |
|---|---|---|
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,701,423 A | 12/1997 | Crozier |
| 5,704,029 A | 12/1997 | Wright, Jr. |
| 5,706,502 A | 1/1998 | Foley et al. |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper |
| 5,721,908 A | 2/1998 | Lagarde et al. |
| 5,721,914 A | 2/1998 | DeVries |
| 5,727,202 A | 3/1998 | Kucala |
| 5,729,735 A | 3/1998 | Meyering |
| 5,745,360 A | 4/1998 | Leone et al. |
| 5,752,246 A | 5/1998 | Rogers et al. |
| 5,757,916 A | 5/1998 | MacDoran et al. |
| 5,758,150 A | 5/1998 | Bell et al. |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Neilsen et al. |
| 5,787,441 A | 7/1998 | Beckhardt |
| 5,790,425 A | 8/1998 | Wagle |
| 5,790,790 A | 8/1998 | Smith et al. |
| 5,799,318 A | 8/1998 | Cardinal et al. |
| 5,832,483 A | 11/1998 | Barker |
| 5,857,201 A | 1/1999 | Wright, Jr. et al. |
| 5,870,759 A | 2/1999 | Bauer et al. |
| 5,909,689 A | 6/1999 | Van Ryzin |
| 5,943,676 A | 8/1999 | Boothby |
| 5,961,590 A | 10/1999 | Mendez et al. |
| 5,968,131 A | 10/1999 | Mendez et al. |
| 5,974,327 A | 10/1999 | Agrawal et al. ............ 455/452 |
| 6,006,274 A | 12/1999 | Hawkins et al. |
| 6,023,708 A | 2/2000 | Mendez et al. |
| 6,044,381 A | 3/2000 | Mendez et al. |
| 6,085,192 A | 7/2000 | Mendez et al. |
| 6,119,014 A * | 9/2000 | Alperovich et al. ........ 455/466 |
| 6,131,096 A | 10/2000 | Ng et al. |
| 6,131,116 A | 10/2000 | Riggins et al. |
| 6,138,124 A | 10/2000 | Beckhardt |
| 6,141,664 A | 10/2000 | Boothby |
| 6,151,606 A | 11/2000 | Mendez |
| 6,201,469 B1* | 3/2001 | Balch et al. ............... 340/10.1 |
| 6,212,529 B1 | 4/2001 | Boothby et al. |
| 6,221,877 B1* | 4/2001 | Aronov et al. .............. 514/297 |
| 6,223,187 B1 | 4/2001 | Boothby et al. |
| 6,233,341 B1 | 5/2001 | Riggins |
| 6,246,875 B1* | 6/2001 | Seazholtz et al. ........ 455/432.1 |
| 6,317,594 B1 | 11/2001 | Gossman et al. ........... 455/414 |
| 6,324,542 B1 | 11/2001 | Wright, Jr. et al. |
| 6,421,781 B1 | 7/2002 | Fox et al. ................... 713/201 |
| 6,708,221 B1 | 3/2004 | Mendez et al. |
| 6,799,190 B1 | 9/2004 | Boothby |
| 6,892,070 B1* | 5/2005 | Warrier et al. .......... 455/432.1 |
| 2001/0032254 A1 | 10/2001 | Hawkins ..................... 709/246 |
| 2002/0038253 A1* | 3/2002 | Seaman et al. ............... 705/26 |
| 2002/0059457 A1 | 5/2002 | Ballard et al. .............. 709/246 |
| 2002/0068559 A1* | 6/2002 | Sharma et al. .............. 455/423 |
| 2002/0077077 A1* | 6/2002 | Rezvani et al. ............. 455/410 |
| 2002/0146129 A1 | 10/2002 | Kaplan ........................ 380/270 |
| 2003/0100326 A1* | 5/2003 | Grube et al. ................ 455/515 |
| 2003/0130984 A1* | 7/2003 | Quinlan et al. ................ 707/1 |

FOREIGN PATENT DOCUMENTS

| | | |
|---|---|---|
| WO | WO 03/098890 | 11/2003 |
| WO | WO 2004/045171 | 5/2004 |

OTHER PUBLICATIONS

Lotus Development Corporation, *Lotus Quick Reference for Windows and Presentation Manager, Lotus Notes Release 3*, Date unknown.

Lotus Development Corporation, *Lotus Quick Reference for Macintosh, Lotus Notes Release 3.0*, Date unknown.

Lotus Development Corporation, *Lotus Quick Reference for Application Developer's, Lotus Notes Release 3*, Date Unknown.

Lotus Development Corporation, *Lotus Customer Support Services*, Date Unknown.

Lotus Software Agreement for "Notes 4.0 NA DKTP CLIENT UPG", Part No. 38985, Date unknown.

Lotus Development Corporation, *Lotus Customer Support, North American Guide*, Date unknown.

Allchin, James E., "An Architecture for Reliable Decentralized Systems", UMI Dissertation Services, Copyright 1983.

Lotus Development Corporation, *Lotus Notes Release 3.1: The Groupware Standard, Administrator's Guide —Server for NetWare, OS/2, and UNIX*, 1989.

Lotus Development Corporation, *Lotus Notes Release 3.1: The Groupware Standard, Site and Systems Planning Guide*, 1991.

Wilcox, Adam A., *PC Learning Labs Teaches Lotus Notes 3.0: The Quick and Easy Way to Learn*, Ziff-Davis Press, 1993.

Lotus Development Corporation, *Lotus Notes Release 3.3: Start Here, Workstation Install for Windows, OS/2 and Macintosh*, 1993.

Lotus Development Corporation, *Lotus Notes Release 3.1: Administrator's Guide—Server for Windows*, 1993.

Lotus Development Corporation, *Lotus Notes Release 3.1: The Groupware Standard, Customer Services Application Guide*, 1994.

Lotus Development Corporation, *Lotus Notes Release 3.1: The Groupware Standard, Getting Started with Application Development*, 1994.

Lotus Development Corporation, *Lotus Notes Release 3.1: The Groupware Standard, Network Driver Documentation*, 1994.

Kornblith, Polly R., *Lotus Notes Answers: Certified Tech Support*, Covers Lotus Notes Release 3, Osborne McGraw-Hill, 1994.

Freeland, Pat and Londergan, Stephen, *Lotus Notes 3/3.1 for Dummies™*, IDG Books Worldwide, 1994.

Gewirtz, David, *Lotus Notes 3 Revealed! Your Guide to Managing Information and Improving Communication Throughout Your Organization*, Prima Publishing, 1994.

Shafran, Andrew B., *Easy Lotus Notes for Windows™*, Que® Corporation, 1994.

Lotus Development Corporation, *Lotus Notes Release 3.3: The Groupware Standard, Administration*, 1994.

McMullen, Melanie, Editor, *Network Remote Access and Mobile Computing*, Miller Freeman Inc., 1994.

Lotus Development Corporation, *Lotus Notes: The Groupware Standard—Windows*, 1994.

IntelliLink Corporation, *IntelliLink® For Windows User's Guide*, Version 3.0, 1994.

Lotus Development Corporation, *Lotus Notes Release 4: InterNotes Web Navigator Administrator's Guide*, 1995.

Lotus Development Corporation, *Lotus InterNotes Release 4 Web Publisher: InterNotes Web Publisher Guide*, 1995.

Lotus Development Corporation, *Lotus Notes Release 4 Install Guide for Servers*, 1995.

Lotus Development Corporation, *Lotus Notes Release 4.1 Release Notes*, 1995.

Lotus Development Corporation, *Lotus Notes Release 4 Migration Guide*, 1995.

Lotus Development Corporation, *Lotus Notes Release 4 Database Manager's Guide*, 1995.

Lotus Development Corporation, *Lotus Notes Release 4 Install Guide for Workstations*, 1995.

Lotus Development Corporation, *Lotus Step by Step: A Beginniner's Guide to Lotus Notes*, 1995.

Lotus Development Corporation, *Lotus Notes Release 4 Programmer's Guide Part 1*, 1995.

Lotus Development Corporation, *Lotus Notes Release 4 Programmer's Guide Part 2*, 1995.
Lotus Development Corporation, *Lotus Notes Release 4 Administrator's Guide*, 1995.
Lotus Development Corporation, *Lotus Notes Release 4 Deployment Guide*, 1995.
Lotus Development Corporation, *Lotus Notes Release 4 Application Developer's Guide*, 1995.
Lotus Development Corporation, *Lotus Notes Release 4 InterNotes Web Navigator User's Guide*, 1995.
Lotus Development Corporation, *Lotus Notes Release 4 Release Notes*, 1995.
Lotus Development Corporation, *Lotus Notes Release 4.5 Install Guide for Workstations*, 1995.
Lotus Development Corporation, *Release Notes, Lotus Notes Release 3.30, Windows, OS/2, and Macintosh*, 1995.
Brown, Kevin, et al., *Mastering Lotus® Notes®*, SYBEX Inc., 1995.
Lotus Development Corporation, *Lotus Notes Release 4.5, Network Configuration Guide*, 1995.
Pyle, Hugh, "The Architecture of Lotus Notes", *Lotus Notes Advisor*, Advisor Publications, Premiere Issue 1995, pp. 18-27.
Lotus Development Corporation, Lotus Notes Knowledge Base, "What is the Notes Replicator", Jul. 5, 1995.
Lotus Development Corporation, Lotus Notes Knowledge Base, "Lotus Announces Lotus NotesPump 1.0", Oct. 31, 1995.
Lotus Development Corporation, Lotus Notes Knowledge Base, "Lotus NotesPump 1.0 Q & A", Oct. 31, 1995.
Grous, Paul J., "Creating an Managing a Web Site with Lotus' InterNotes Web Publisher", *The View Technical Journal for Lotus Notes® Software*, vol. 1, Issue 4, Sep./Oct. 1995, pp. 3-18.
Cole, Barb, "Lotus airs Notes-to-database integration tool", www.looksmart.com, Oct. 2, 1995.
Lotus Development Corporation, Lotus Notes Knowledge Base, "Lotus NotesPump: Database Integration for Lotus Notes", Oct. 31, 1995.
Lotus Development Corporation, Lotus Notes Knowledge Base, "How to Set Up "Firewall" Protection for a Notes Domain", Nov. 6, 1995.
Freeland, Pat and Londergan, Stephen, *Lotus Notes Release 4 for Dummies™*, IDG Books Worldwide, 1996.
Kreisle, Bill, *Teach yourself . . . Lotus Notes 4*, MIS:Press, 1996.
Marmel, Elain, *Easy Lotus ® Notes Release 4.0*, Que Corporation, 1996.
Lotus Development Corporation, *Lotus Notes Server Up and Running!, Release 4*, 1996.
Falkner, Mike, "How to Plan, Develop, and Implement Lotus Notes in Your Organization", Wiley Computer Publishing, John Wiley and Sons, Inc., 1996.
Lamb, John P., et al., "Lotus Notes Network Design", McGraw-Hill, 1996.
Tamura, Randall A., et al., *Lotus Notes 4 Unleashed*, Sams Publishing, 1996.
Dahl, Andrew, *Lotus Notes 4 Administrator's Survival Guide*, Sams Publishing, 1996.
Lotus Development Corporation, *Lotus Notes Internet Cookbook for Notes Release 3*, Jan. 16, 1996.
Wong, Harry, "Casahl's Replic-Action: Delivering True Notes/DBMS Integration", *The View Technical Journal for Lotus Notes® Software*, vol. 2, Issue 1, Jan./Feb. 1996, pp. 33-50.
IBM International Technical Support Organization, *Lotus Notes Release 4 In a Multiplatform Environment*, Feb. 1996.
Lotus Development Corporation, *Lotus Notes Internet Cookbook for Notes Release 4*, Feb. 14, 1996.
Blaney, Jeff, "You Can Take it with you: An Introduction to Mobile Computing with Notes R4", *The View Technical Journal for Lotus Notes® Software*, vol. 2, Issue 1, Jan./Feb. 1996, pp. 22-32.
Frenkel, Garry, "Pumping for Info: Notes and Database Integration", *Network Computing*, May 1, 1996, pp. 76-84.
Lotus Development Corporation, Lotus Notes Knowledge Base, "Firewall Security Overview and How Firewalls Relate to Lotus Notes", May 22, 1996.
Augun, Audry, "Integrating Lotus Notes with Enterprise Data", Lotus Notes Advisor, Advisor Publications, Jul./Aug. 1996, pp. 22-25.
IBM Corporation, *Secrets to Running Lotus Notes: The Decisions No One Tells You How to Make*, Oct. 1996.
Opyt, Barbara, et al., "Use the Internet as Your Lotus Notes WAN", *Lotus Notes Advisor*, Advisor Publications, Nov./Dec. 1996, pp. 17-20.
Swedeen, Bret, et al., "Under the Microscope: Domino Replication", *LDD Today*, Oct. 1, 1998.
Lotus Development Corporation, *Lotus Inside Notes: The Architecture of Notes and the Domino Server*, 2000.
"The History of Notes and Domino", Lotus Developer Doman, Lotus, Sep. 29, 2003.
Lotus NotesPump miscellaneous paper, date unknown, no date listed.
NotesPump 1.0 Release Notes, date unknown, no date listed.
Lotus Notes-Notes Administration Help screen shot, date unknown.
Chapter 13-1, publication unknown, "Anatomy of a Note ID", date unknown.
Chapter: About NotesPump, publication unknown, date unknown.
Lotus Development Corporation, Lotus Notes 3.3, *Lotus Customer Support, North American Guide*, 29 pages, Date unknown.
Lotus Development Corporation, Lotus Notes 4.0, *Lotus Customer Support, North American Guide*, 29 pages, Date unknown.
Lotus Development Corporation, Lotus Notes 4.1 Starter Pack, *Lotus Customer Support, North American Guide*, 51 pages, Date unknown.
Lotus Development Corporation, "LotusScript Classes for Notes Release 4", 6 pages, date unknown.
Netscape Communications Corporation, Installation Guide, Netscape Mail Server, Version 2.0 for Unix, 1995, no month listed.
Netscape Communications Corporation, User's Guide, Netscape Mail Server, Version 2.0, 1995, no month listed.
Netscape Communications Corporation, Administrator's Guide, Netscape Mail Server, Version 2.0, 1995, no month listed.
*Lotus Notes Advisor*, Advisor Publications, Jun. 1995, entire magazine.
IBM, "The Architecture of Lotus Notes", White Paper, No. 114654, modified date: May 31, 1995.
*Lotus Notes Advisor*, Advisor Publications, Aug. 1995, entire magazine.
*Lotus Notes Advisor*, Advisor Publications, Oct. 1995, entire magazine.
Balaban, Bob, "This is Not Your Father's Basic: LotusScript in Notes Release 4", *Lotus Notes Advisor*, Advisor Publications, vol. 1, No. 5, Nov./Dec. 1995, pp. 31-58.
Pyle, Lisa, "A Jump Start to the Top Ten R3-to-R4 Migration Considerations", *Lotus Notes Advisor*, Advisor Publications, vol. 1, No. 5, Nov./Dec. 1995, pp. 3-20.
*Lotus Notes Advisor*, Advisor Publications, Dec. 1995, entire magazine.
Lotus Development Corporation, *Lotus Notes Release 4 Install Guide for Workstations*, First Revision, 1996, no month listed.
Lotus Development Corporation, *Lotus Step by Step: A Beginner's Guide to Lotus Notes*, First Revision, 1996, no month listed.
Netscape Communications Corporation, Administrator's Guide, Netscape News Server, Version 2.0, 1996, no month listed.
*Lotus Notes Advisor*, Advisor Publications, Jan./Feb. 1996, entire magazine.
*Lotus Notes Advisor*, Advisor Publications, Apr. 1996, entire magazine.
*Lotus Notes Advisor*, Advisor Publications, Jun. 1996, entire magazine.
*Lotus Notes Advisor*, Advisor Publications, Aug. 1996, entire magazine.
*Lotus Notes Advisor*, Advisor Publications, Oct. 1996, entire magazine.
*Lotus Notes Advisor*, Advisor Publications, Dec. 1996, entire magazine.

* cited by examiner

CONNECTION ARCHITECTURE FOR A MOBILE NETWORK

BACKGROUND

Mobile email messaging systems typically use a store and forward architecture. Electronic Mail (email) redirector software runs either on an enterprise email server or on a desktop computer. The redirector software monitors a user mailbox. When a new email message is received in the mailbox, the redirector makes a copy of the email message and wraps the copy in an encryption envelope and encapsulates the copy for delivery to the mobile device. The redirector may optionally encrypt and/or digitally sign the encapsulated email message.

The encrypted encapsulated email message is sent out over the Internet and routed to a mobile device associated with the user mailbox. If encrypted, the email message is decrypted by the mobile device prior to being stored on the mobile device and then displayed and stored on the mobile device. This same process is repeated for every new email that is received in the user's mailbox.

Thus, with this architecture two versions of the same mailbox exist. The primary mailbox on the email server or desktop PC, and the replicated mailbox on the mobile device. Consistency between the primary and the replicated mailbox may be maintained to some degree using synchronization messages passing back and forth between the redirector and the mobile device. For example, an email message deleted from the mobile device may result in a synchronization message to the desktop redirector, which instructs it to also delete that message from the primary mailbox. In some versions of this architecture, no effort at all is made to ensure consistency of mailbox state between the primary and replicated instances. This store and forward architecture is cumbersome, does not operate in real-time, and requires sending a large number of email messages over the Internet. The present invention addresses this and other problems associated with the prior art.

SUMMARY OF THE INVENTION

A real-time communication architecture establishes a continuous connection between an enterprise network and a communication management system. The connection is continuously held open allowing mobile devices real-time access to enterprise data sources such as email systems. The real-time communication architecture can support an entire enterprise email system or individual email users.

The foregoing and other objects, features and advantages of the invention will become more readily apparent from the following detailed description of a preferred embodiment of the invention which proceeds with reference to the accompanying drawings.

DETAILED DESCRIPTION

For simplicity, data, databases, files, and data transactions may be referred to generally as Electronic mail (email), email transactions, mailboxes, etc. However, it should be understood that any type of email data or email transaction described below can be similarly performed for calendars, contacts, tasks, notes, electronic documents, files or any other type of data that needs to be transferred between a local network and a mobile device.

Figure 1:
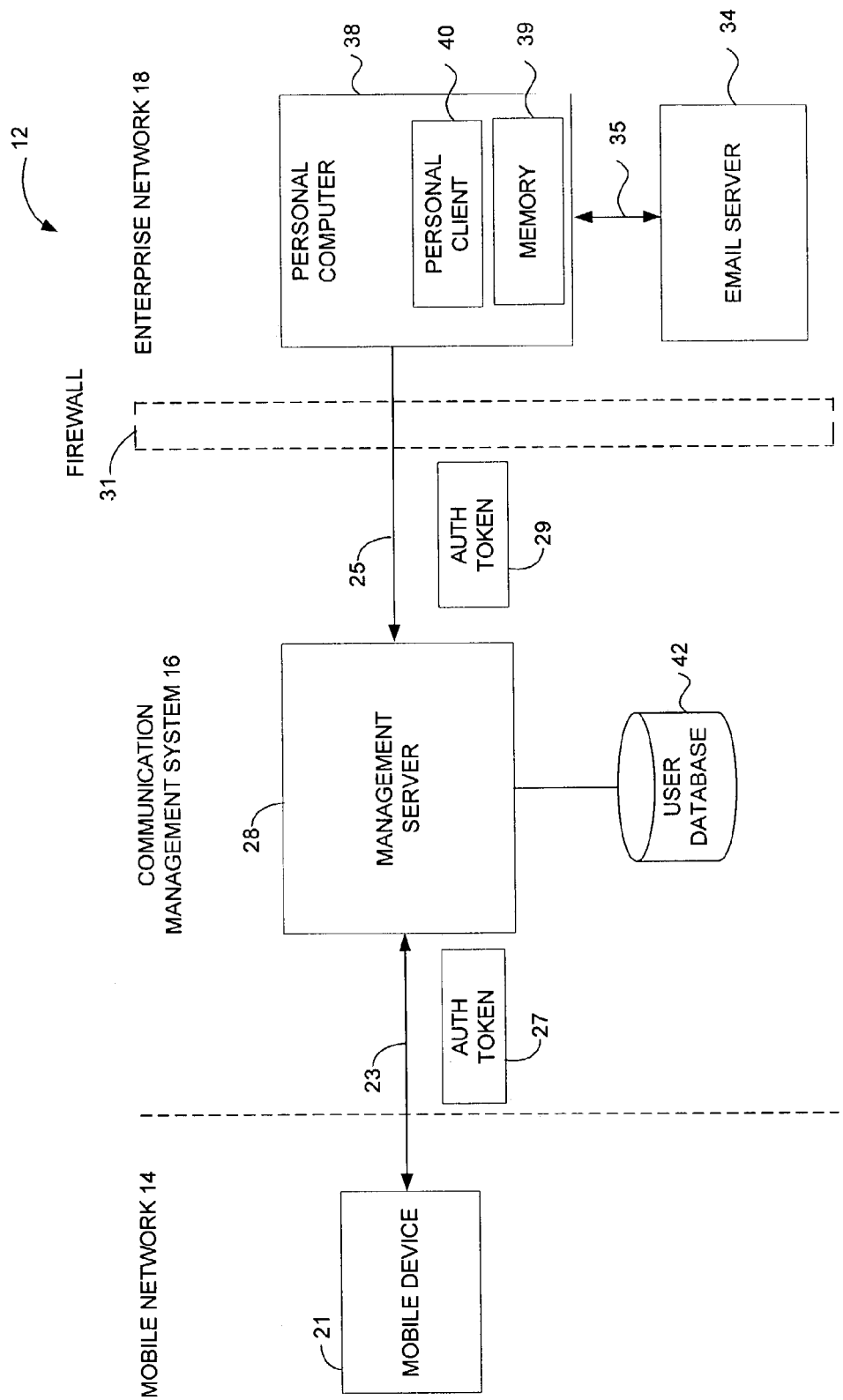
FIG. 1 is a block diagram of a mobile communication architecture according to one embodiment of the invention.

FIG. 1 shows one embodiment of a real-time communication architecture 12 that includes a mobile network 14, an enterprise network 18, and a communication management system 16 that manages communications between the mobile network 14 and the enterprise network 18.

The enterprise network 18 in one instance is a private network that contains a firewall 31. The firewall 31 can be a set of related programs, located at a network gateway server that protects the resources of the enterprise network 18 from users from other networks. The term 'firewall' also implies the security policy that is used with the firewall programs.

The mobile network 14 includes mobile devices 21 that communicate over the Internet through a wireless or landline mobile network 14. Since mobile networks 14 are well known, they are not described in further detail.

The enterprise network 18 can be any business network, individual user network, or local computer system that maintains local email or other personal data for one or more users. In the embodiment shown in FIG. 1, the enterprise network 18 includes an email server 34 that is accessed by multiple Personal Computers (PCs) 38. In one example, the email server 34 may be a Microsoft® Exchange® server and the PCs 38 may access email on the email server 34 through a Microsoft® Outlook® software application. The email server 34 can store email mailboxes, contact lists, calendars, tasks, notes, or any other type of local data or electronic document.

The PC 38 is connected to the email server 34 over a Local Area Network (LAN) 35. The PC 38 includes memory 39 for storing local files that may include personal email data as well as any other types of electronic documents. Personal client software 40 is executed by a processor in the PC 38. The personal client 40 exchanges transactions with the mobile device 21 for browsing email, calendars, and contact information as well as accessing local files.

A communication management system 16 includes at least one management server 28 that manages the transactions between the mobile device 21 and the enterprise network 18. A user database 42 includes configuration information for different users. For example, the user database 42 may include login data for user's in enterprise network 18.

Enterprise Version

Figure 2:
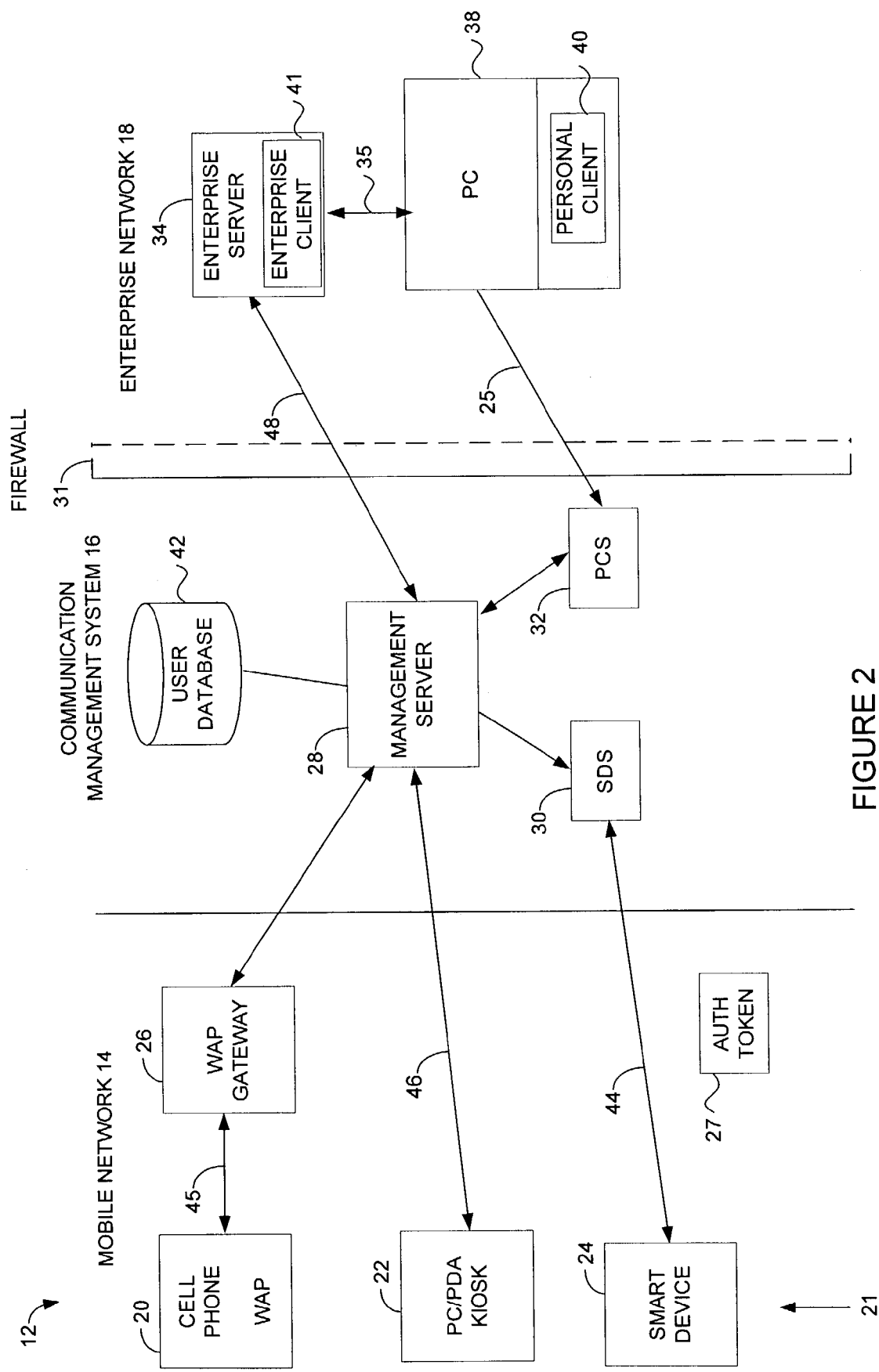
FIG. 2 is a block diagram of an enterprise version of the communication architecture.

FIG. 2 shows an enterprise version of the communication architecture 12. The enterprise network 18 includes an enterprise server 34 that connects through LAN connection 35 to multiple PCs 38. The enterprise server 34 also includes an enterprise client 41 that can communicate directly with the management server 28.

The communication management system 16 in FIG. 2 includes the management server 28, as well as one or more Smart Device Servers (SDS) 30, and one or more Personal Client Servers (PCS) 32. The SDS 30 handles communications with particular smart mobile devices 24. The PCS 32 manages communications with personal clients 40.

The mobile devices 21 in FIG. 2 are shown in more specificity and include cell phones 20 having WAP interfaces that communicate with management server 28 through a WAP gateway 26. Other mobile devices 21 may include PCs, PDAs, Internet kiosks 22, or any other smart mobile device 24 that operates as communication endpoints.

Mobile connection 23 in FIG. 1 and mobile connections 45, 46 and 44 in FIG. 2 are any connections that allow the mobile devices 21 to communicate over the Internet. For example, the connections 23, 44, 45 and 46 may be through landlines, cellular channels, 802.11 wireless channels, satellite channels, etc.

Continuous Real-Time Connectivity

Referring specifically to FIG. 1, the personal client 40 automatically establishes a continuous connection 25 between the PC 38 and management server 28. The personal client 40 initiates an outbound connection 25 which is then authenticated by the management server 28. For example, the client 40 presents an authentication token 29 to the management server 28. The management sever 28 then attempts to match the information in the authentication token 28 with information in user database 42.

If the authentication token 29 is authenticated, the connections 25 or 48 are established through the firewall 31 to achieve access to the management server 28 which is outside the private enterprise network 18. The management server 28 then sends the personal client 40 connection authorization and any other needed information. For example, the management server 28 may send back connection sharing information, email notification filters, and other mobile communication configuration parameters associated with a particular user.

The management server 28 and the personal client 40 then go into a quiescent mode until a transaction, such as a data query, is transferred between the mobile device 21 and the personal client 40. If for any reason the connection 25 is disconnected, the personal client 40 automatically establishes another connection 25 with management server 28.

It is important to note that the connection 25 is continuously maintained even when no connection 23 is currently exists between mobile device 21 and management server 28. In one embodiment, the connection 25 is a Transmission Control Protocol/Internet Protocol (TCP/IP) connection. However, any connection protocol can be used that allows continuous connectivity between the enterprise network 18 and communication management system 16.

In an alternative embodiment, the connection 25 may be established through a proxy server (not shown) in enterprise network 18. For example, messages sent by the personal client 40 may be encrypted by the proxy server with a Secure Sockets Layer (SSL).

After the connection 25 is established by the personal client 40, a mobile connection 23 can be established at any time between the mobile device 21 and the management server 28. After the mobile connection 23 is established, the mobile device 21 can then access email and other information in the email server 34 or memory 39 through personal client 40. Thus, after connection 25 is established, the personal client 40 effectively operates as an email server for the mobile device 21.

Referring to FIG. 2, in a manner similar to the personal client 40, an enterprise client 41 establishes a continuous connection 48 with the management server 48 similar to the connection 25 established between the personal client 40 and management server 28. The connection 48 is used for relaying transactions between multiple mobile devices 21 and multiple email users on enterprise server 34 at the same time.

In the version of the communication architecture shown in FIG. 2, the personal client 40 may establish connection 25 with the management server 28 through PCS 32 and certain mobile devices 24 may establish mobile connections 44 through the SDS 30.

Mobile Device Log-In

Referring to FIGS. 1 and 2, the management server 28 authenticates mobile connections 23, 44, 45, and 46 initiated by the mobile devices 21. When a user signs up for a mobile account, a copy of the user's username and password for the enterprise network 18 is stored in the user database 42. After the mobile device 21 powers on, the user is required to login to the communication management system 16 by entering another user name and password. If the mobile device 21 accesses email through the enterprise server 34, as opposed to through the PC 38, then an enterprise identifier (e.g., name) may also be required.

The mobile device 21 sends an authentication token 27 either directly to the management server 28 or to the SDS 30 which forwards the authorization token 27 to the management server 28. The management server 28 verifies information in the authorization token 27 with information in the user database 42. If the authentication token 27 is verified, the management server 28 sends an authorization acknowledgement directly to the mobile device 21 or through the SDS 30.

Once the mobile device 21 has successfully logged in, the management server 28 unlocks the user's enterprise user name and password. This allows the mobile device 21 to access email and other local files in the enterprise network 18 either through connection 25 or connection 48.

The management server 28 also conducts rendering and view functions needed for presenting email and other data to the different mobile devices 21. For example, the management server 28 reformats local data retrieved from the enterprise network 18 according to the particular mobile device 21 requesting the information. The management server 28 also operates as a transactional routing engine for routing transactions between the mobile devices 21 and the enterprise network 18.

Stateless Non-Replicated Connectivity

Figure 3:
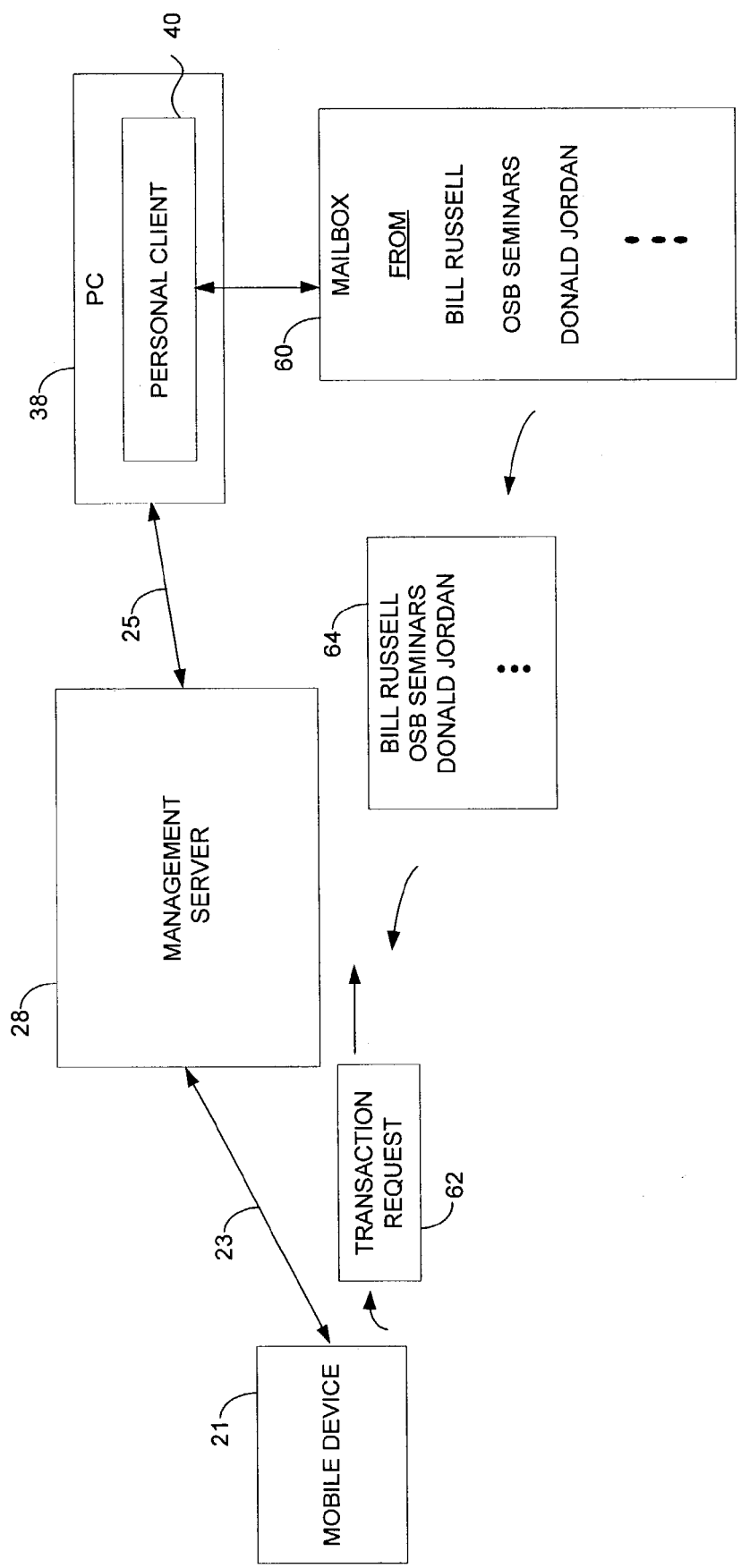
FIG. 3 is a block diagram showing how transactions are transferred in the communication architectures shown in FIGS. 1 and 2.

Referring to FIG. 3, once the mobile device 21 has successfully logged in, stateless connectivity exists between the mobile device 21 and the personal client 40 over connections 23 and 25. For example, the mobile device 21 may send a transaction request 62 to the personal client 40 to view emails in the users mailbox 60.

The transaction request 62 is sent from the mobile device 21 to the management server 28 over mobile connection 23. The management server 28 locates the personal client 40 associated with request 62 and forwards the request 62 over the appropriate connection 25. The personal client 40 accesses data in mailbox 60 according to the transaction request 62. For example, if the transaction request 62 requests viewing the user's latest emails, the personal client 40 generates an email list 64 containing the emails received in mailbox 60. The personal client 40 then sends the email list 64 back to the mobile device 21 through connection 25.

If the mobile device 21 has limited memory or viewing capability, only a latest portion of the emails in mailbox 60 may be included in email list 64. Alternatively, the personal client 40 may send all of the emails in mailbox 60 to the management server 28. The management server 28 then doles out portions of the email list 64 to the mobile device 21 according to the type of electronic platform used by the mobile device 21.

These transactions allow the mobile device 21 to view information in mailbox 60 in real time without having to maintain a second version of the emails in mailbox 60. Once the connection 23 is terminated, the email list 64 received by the mobile device 21 may be deleted. If emails in mailbox 60 need to be viewed again, the mobile device 21 sends a new transaction request 62 to the personal client 40.

If the items requested in transaction 62 are too numerous or too large for viewing by the mobile device 21, the personal client 40 may send only enough information in list 64 to identify the items. For example, the personal client 40 may glean out from an email the email sender information, when the email was sent, and the subject line. The personal client 40 may only send out this gleaned information for the latest emails received in mailbox 60.

The mobile device 21 receives the gleaned partial list 64 and can then select one or more of the items in list 64 for viewing. Depending on the type of data requested for viewing, another transaction request 62 may be sent from mobile device 21 to personal client 40 to view the selected email in its entirety. The personal client 40 then sends any remaining contents of that selected email to the mobile device 21. Alternatively, if the gleaned partial email list 64 does not contain the email that the mobile device user wishes to view, the mobile device 21 can send another transaction request 62 to the personal client 40 to view a second portion of the emails contained in mailbox 60.

After the transaction between the mobile device 21 and the management server 28 is completed, no emails from mailbox 60, or any other files from the PC 38 need to remain on the mobile device 21. That is unless the mobile device 21 saves a copy of the data. Thus, the servers 28, 30 and 32 and the mobile devices 21 shown in FIGS. 1–2 do not have to maintain a second version of the email data in mailbox 60.

This stateless connectivity does not require the large number of transactions that are typically required in store and forward architectures and also eliminates having to copy emails and send the copies to the mobile device each time an email is received at the user's mailbox.

Local Data File Access

Figure 4:
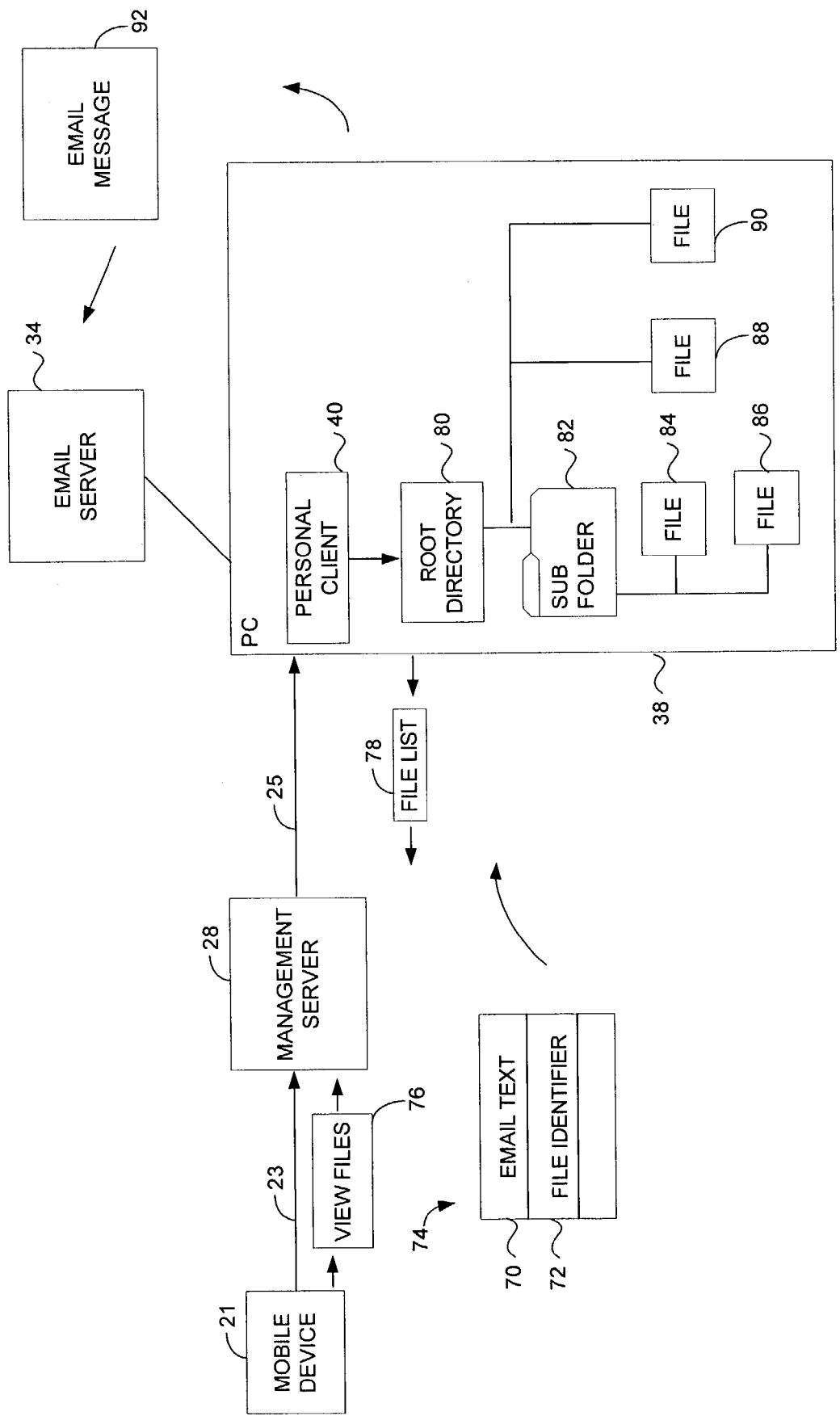
FIG. 4 is a block diagram showing how local network files are viewed and selected by a mobile device.

FIG. 4 shows how the mobile device 21 accesses local files contained on the PC 38 and attaches those local files to email messages. The personal client 40 operating on PC 38 is initially configured to point to a root directory 80. The root directory 80 may include multiple subfolders 82 that contain files 84 and 86. Other files 88 and 90 may be located at the top level of the root directory 80 or located in other subfolders.

Some mobile devices 21 may not have the capability to actually open and read the files in root directory 80 or there may be too much data in certain files for the mobile device 21 to store. In these situations, the mobile device 21 can still view, navigate and select folders and files located under the root directory 80.

An email message 70 is opened on the mobile device 21. An Insert File option may then be selected in the email application running on the mobile device 21. Selecting the Insert File option sends a view files transaction 76 from the mobile device 21 to the management server 28.

The management server 28 sends the transaction 76 over the appropriate connection 25 to personal client 40. The personal client 40 receives the transaction 76 and determines the mobile device 21 has requested a list of files in root directory 80. The personal client 40 generates a response containing a file list 78 identifying the subfolders 82 and files 84–90 in root directory 80. The response message containing file list 78 is then sent back to the mobile device 21 over connection 25.

All or part of the file list 78 may be sent to mobile device 21. For example, the management server 28 may determine the mobile device 21 has insufficient memory to view the entire file list 78. The management server 28 could also determine it would take too much time to send the entire file list 78 to the mobile device 21. In these cases, the management server 28 may only send a portion of the file list 78 to the mobile device 21.

The mobile device 21 displays the file list 78 received from the management server 28 and selects any of the listed files or subfolders. A subfolder in the file list 78 may be selected that contains files not included in the file list 78. This causes the mobile device 21 to send out another view file transaction 76 to the management server 28 requesting a list of the files contained in the selected subfolder. The management server 28, or personal client 40, then sends back another file list 78 containing the files in the selected subfolder.

If one or more files are selected from the file list 78, an associated file identifier 72 is inserted into the email message 70. In one example, selecting files is equivalent to a Hypertext Markup Language (HTML) forms submission where an item is selected from a website. When an email Send command is selected on the mobile device 21, an email transaction 74 is sent to the management server 28 that includes email message 70 and file identifier 72.

The management server 28 sends the email transaction 74 through connection 25 to the personal client 40. In the enterprise network shown in FIG. 2, the email transaction 74 may travel from the SDS 30 to the management server 28 and then through the PCS 32 and connection 25 to the personal client 40.

The personal client 40 unwraps the email transaction 74 and extracts the email message 70 containing the file identifier 72. The personal client 40 reformats the email message 70 into an email message 92 and then attaches the file in root directory 80 corresponding to file identifier 72. The email message 92 with the attached file is then sent by the personal client 40 to the email server 34. A copy of the email message 92 may also be copied to the Sent Items folder in the user's mailbox.

Storing Queries

Figure 5:
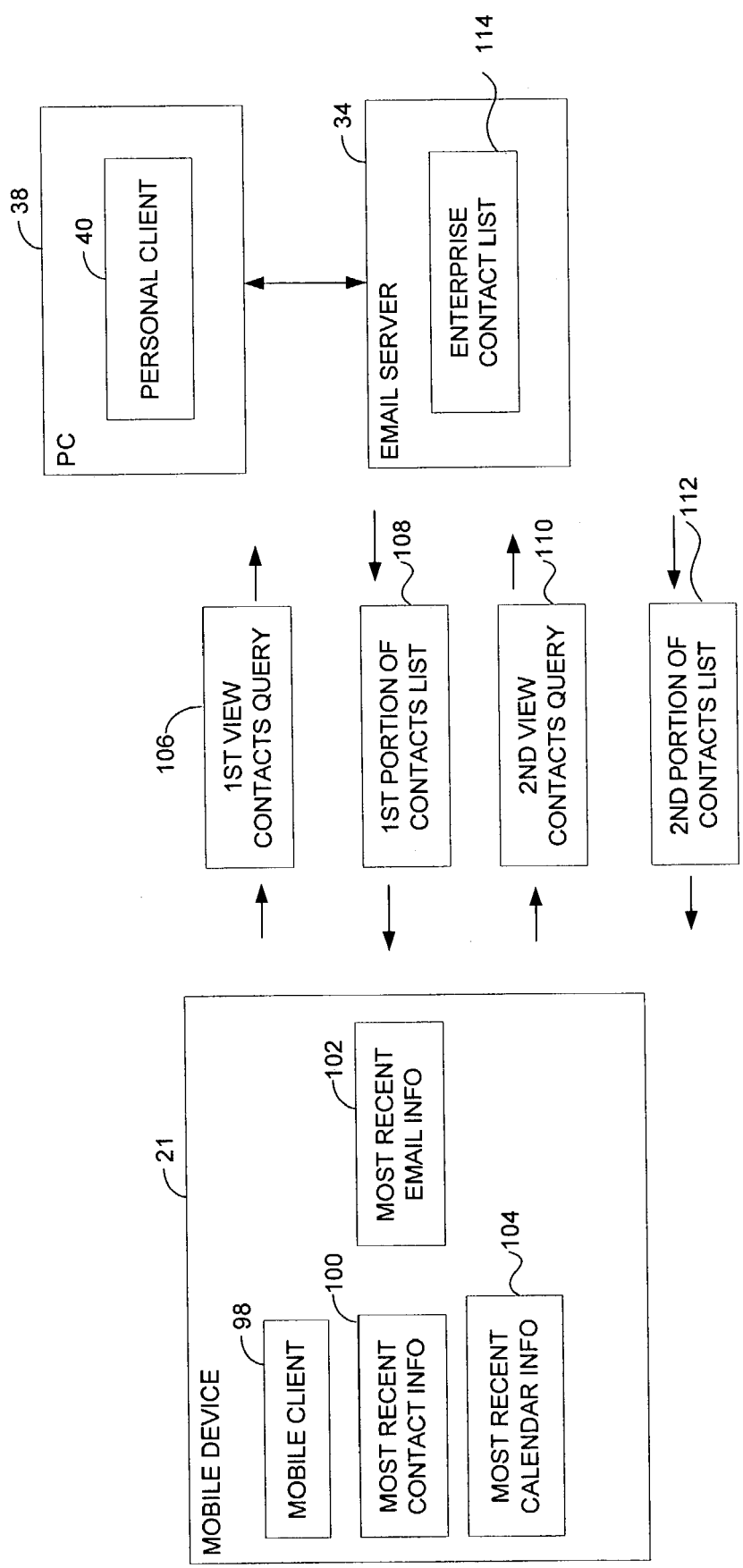
FIG. 5 is a block diagram showing how data is stored in a mobile device.

Referring to FIG. 5, some mobile devices 21 referred to as smart mobile devices may include software that operates a mobile client 98 that receives and transmits data. The mobile device 21 can store another version of the local data in email server 34. The stored data can include contact information stored in memory section 100, emails stored in memory section 102 and calendar information stored in memory section 104. The mobile device 21 can view, generate emails, and generally manipulate the data in memory section 100-104 off-line.

The mobile client 98 can maintain a latest version of queried data in memory section 100-104 using the stateless connectivity architecture described above. For example, when a View Contacts operation is initiated on the mobile device 21, the mobile client 98 sends a view contacts transaction 106 to the personal client 40. The mobile device 21 may have requested the contacts list 114 for the entire enterprise network. If the contacts list 114 is too large to send to the mobile device 21, the personal client 40 may only send back a first portion 108 of the contacts list. For example, a list of contacts for the first few letters of the alphabet.

If the contact the user is looking for is not within the first contacts list portion 108, the user can send a second View Contacts transaction 110 to the personal client 40. The second transaction 110 may identify a specific letter of the alphabet for the personal client 40 to query. Alternatively, the transaction 110 may direct the personal client 40 to send back a next portion of the enterprise contact list 114 immediately following contacts list portion 108. The personal client 40 sends back a second portion 112 of contact list 114 pursuant to the transactions 110. If the contact the user is looking for is in the second contact list portion 112, no further queries are sent from the mobile device 21.

The mobile client 98 can store the last received contact list portion 112 in memory 100. According to the amount of memory available in the mobile device 21, the mobile client 98 may save the last few contact list portions 112 and 108 in memory 100. Thus, when the mobile device 21 goes off-line, a user is still able to view the latest information received from personal client 40. The mobile client 98 can also save the most recent email queries in memory space 102 and the most recent calendar queries in memory space 104.

Synchronization

Figure 6:
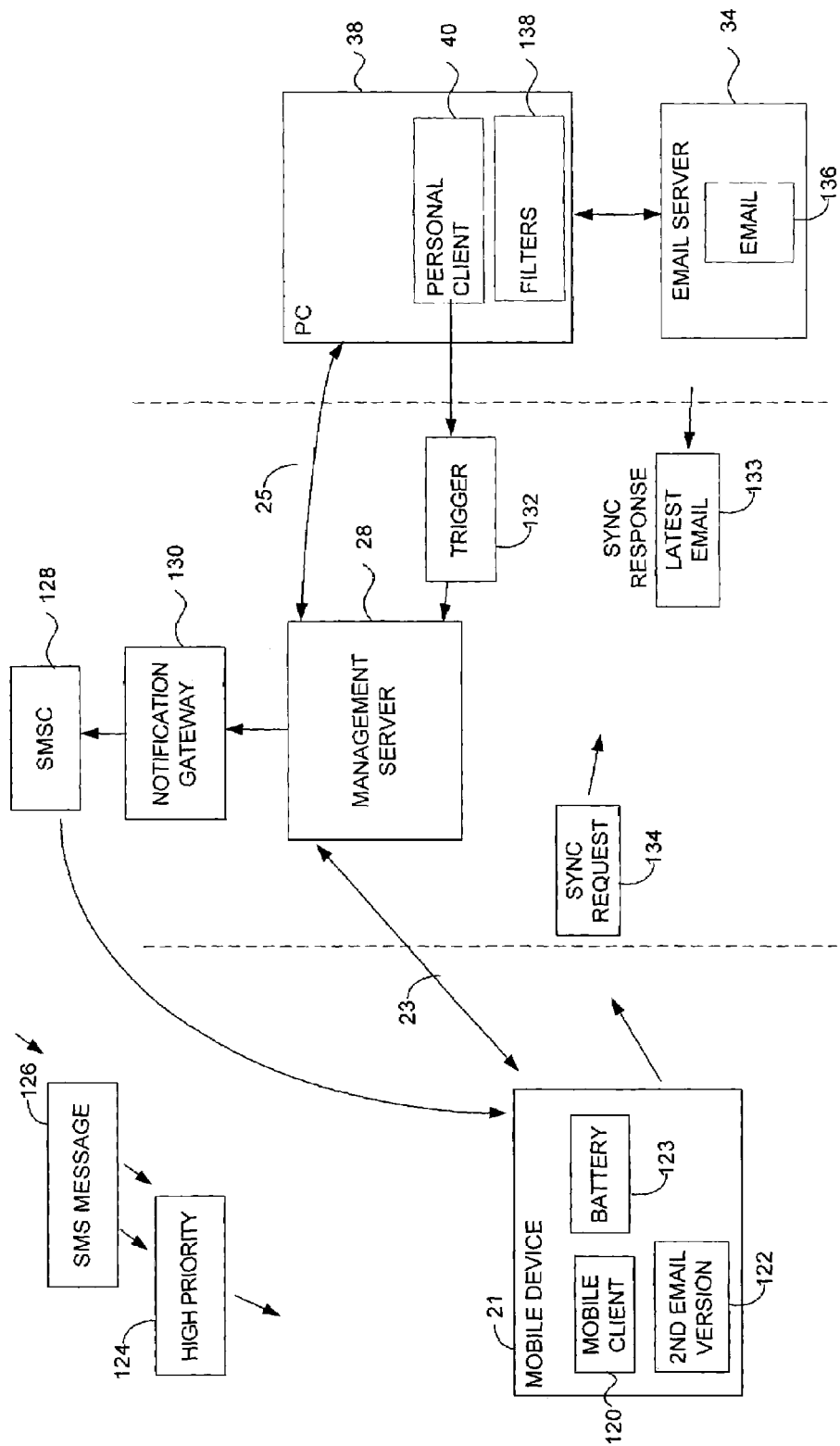
FIG. 6 is a block diagram showing how the mobile device is synchronized.

Referring to FIG. 6, the mobile device 21 may store a second version 122 of the user's local data. It may be necessary from time to time to synchronize the second version 122 on the mobile device 21 with the local version 136 on the email server 34. In one embodiment, the mobile device periodically sends out synchronization requests 134 to the personal client 40. The personal client 40 generates a response 133 pursuant to the synchronization request 134 that contains the latest emails, or other local user data. The response 133 is sent back to the mobile device 21 and is used for updating data 122.

Triggers can be used to notify the mobile device 21 when new emails arrive on the email server 34. Filters 138 are configured in the personal client 40 that identify the types of emails or other types of events that cause the mobile device 21 to send a trigger 132.

For example, the filters 138 may tell the personal client 40 to send a trigger 132 each time a new email arrives in the user's mailbox. The personal client 40 monitors the user's mailbox in email server 34 for new emails. If a new email is detected, the personal client 40 sends a trigger 132 to the mobile device 21 through the management server 28. The trigger 132 may be a message with no payload that simply tells the mobile device 21 that something new has happened in the user's mailbox. The trigger 132 causes the mobile device 21 to establish the mobile connection 23 with the management server 28 and then send a synchronization request transaction 134 to the personal client 40.

In one implementation, Short Message Service (SMS) messages 126 are used to trigger the mobile device 21 into establishing the mobile connection 23 and send the synchronization request transaction 134. The management server 28 is coupled through a notification gateway 130 to a Short Message Service Controller (SMSC) 128 operated by a mobile communication service carrier. In other implementations, some other notification protocol, such as a Wireless Application Protocol (WAP) Push is used to trigger the mobile device 21.

The personal client 40 generates the trigger message 132 whenever an event associated with the user's mailbox 136 corresponds with an event identified in filters 138. The trigger message 132 causes the management server 28 to send a message through the notification gateway 130 to the SMSC 128. The SMSC 128 accordingly sends the SMS message 126 to the mobile device 24.

The mobile device 21 monitors for particular SMS messages having some particular computer readable content. When SMS message 126 is received having that particular content, the mobile device 21 initiates a mobile connection with management server 28. The mobile device 21 may extract the SMS message 126 from a user queue before a user has a chance to see it.

The mobile device 21 initiates an authentication process with the management server 28. After successful authentication, the synchronization request 134 is sent from the mobile device 21 to the management server 28. The management server 28 transfers the request 134 to the personal client 40 over the previously established connection 25. The personal client 40 upon receiving the synchronization request 134 sends back a response 133 that includes a list of the latest emails in the user's mailbox 136.

High Priority Email

Still referring to FIG. 6, the connection architecture shown above can also be used for providing notification of high priority emails. The personal client 40 may be configured to monitor the email server 34 for particular types of email messages. For example, the filters 138 may cause the personal client 40 to look for any emails sent from a particular sender email address. For example, email sent from the user's supervisor.

Whenever an email arrives in the user's mailbox 136 sent from the supervisor's email address, the personal client 40 sends a stripped down version of that email through the management server 28 to the SMSC 128. For example, the stripped down version may only identify the sender, time, date, and subject line for the email message. The SMSC 128 then sends a SMS high priority message 124 to the mobile device 24.

The stripped down high priority SMS message 124 may be slightly different than the SMS message 126 used for triggering mobile device synchronization. For example, the SMS message 126 may not contain any email content, while the priority message 124 includes some portion of the actual email content received in mailbox 136. The high priority message 124 can be sent to any SMS capable mobile device.

Power Management

The mobile device 21 can periodically initiate synchronization according to an amount of charge remaining in a battery 123. For example, when battery 123 has a relatively large amount of charge remaining, the mobile device 21 may synchronize more frequently than when the battery 123 has a relatively small amount of charge remaining. Systems for determining an amount of charge remaining in battery are well known and are therefore not described in further detail.

Different charge gradient levels can be used for varying how often the mobile device 21 synchronizes with the personal client 40. For example, the mobile device 21 may synchronize every 5 minutes when the battery 123 has 75% or more charge remaining and may synchronize every 10 minutes when the battery 123 is between 75% and 50% charged. When the battery 123 is between 50% and 25% charged, the mobile device 21 may only synchronize with personal client 40 every 30 minutes. Other charge/synchronization rates can also be used.

To further conserve power, synchronization can be varied according to the day of the week. For example, the mobile device 21 may synchronize less often on weekends than on weekdays.

Summary

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method for transferring data comprising:

establishing a first connection from a client operating in a local network to a server located in a publicly accessible network that is external and operates independently and outside of the local network, the local network accessible from the publicly accessible network only through one or more local network firewalls and the first connection being initiated outbound from the client in the local network through the one or more firewalls to the server in the publicly accessible network;

establishing a second connection from a mobile device to the server in the publicly accessible network through a mobile network, the mobile network also operating outside and independently of the local network;

sending transactions between the mobile device and the client using both the first connection established between the client in the local network and the server in the publicly accessible network and the second connection established between the mobile device in the mobile network and the server in the publicly accessible network, said transactions being exchanged over a transaction path that extends from the mobile device over both the mobile network and the publicly accessible network to the server and from the server over both the publicly addressable network and through the one or more firewalls over the local network to the client operating in the local network;

continuously maintaining the first connection between the server and the client over both the publicly accessible network and through the one or more firewalls over the local network after the second connection is terminated for maintaining communication accessibility from the publicly accessible network through the one of more firewalls to the local network for the same or other mobile devices that need to subsequently communicate with the client; and establishing a new third connection from the same or another mobile device over both the mobile network and the publicly accessible network to the server after termination of the second connection and sending new transactions from the mobile device to the server in the publicly accessible network over the newly established third connection and also using the previously established and continuously maintained first connection to forward the new transactions from the server in the publicly accessible network through the one or more firewalls to the client in the local network without having to establish a new outbound connection from the client in the local network through the one or more firewalls to the server in the publicly accessible network;

wherein the first connection is a continuously maintained communicative logical connection.

2. A method according to claim 1 wherein the first connection is a Transmission Control Protocol (TCP) connection that is continuously maintained by the server independently of the termination of the second connection and independently of any other communications between the server and any other mobile device, wherein the second connection is terminated by the mobile device in response to completing the transactions between the mobile device and the client, and wherein the new transactions are automatically transferred over the first connection independently of an amount of time between when the second connection is terminated by the mobile device and when the third connection is established by the mobile device.

3. A method according to claim 1 including automatically reestablishing the first connection in response to a disconnection of the first connection and maintaining the first connection for forwarding transactions received from the same or another mobile device over the wireless network to the client through the one or more firewalls over the first connection independently of whether the wireless connection is established or terminated by the same or another mobile device over the wireless network.

4. A method according to claim 1 including:

sending a file query, email query, or other data query from the mobile device to the local network over the second connection and the first connection;

generating a file list or response at the local network according to the query; and sending the file list or response back to the mobile device over the first connection and the second connection.

5. A method according to claim 4 including:

selecting a file name, email, or other data item from the file list or response displayed on the mobile device;

attaching a file or data identifier to an email message identifying the selected file or data item;

sending the email message from the mobile device to the local network; and attaching a file or other data item associated with the file or data identifier to the email message after the email message is sent from the mobile device and sending out the email message over an Internet Protocol (IP) network.

6. A method according to claim 1 including:

storing a representation of data in the local network on the mobile device;

sending a synchronization request from the mobile device to the local network over the second connection and the first connection requesting an updated representation of the data; and sending the updated representation of the data back to the mobile device over the first connection and the second connection according to the synchronization request.

7. A method according to claim 1 including:

storing filters in the local network that identify specific types of data;

sending a message identifier when any of the identified types of data associated with the filters are received;

using a Short Message Service or other notification protocol to relay the message identifier to the mobile device.

8. A method according to claim 7 wherein at least one of the filters identifies high priority data.

9. A method according to claim 1 including:

sending a first query transaction from the mobile device to the local network for a file list;

sending a first partial file list to the mobile device;

storing the first partial file list in the mobile device;

sending a second query transaction from the mobile device to the local network requesting a different portion of the file list;

sending a second partial file list to the mobile device; and replacing the first partial file list in the mobile device with the second partial file list.

10. A method according to claim 1 including:

identifying an amount of charge in a mobile device battery; and automatically synchronizing the mobile device with the local network at different time intervals according to the amount of charge in the battery.

11. The method according to claim 1 including:

sending an authentication token from the local network to the server and establishing the logical first connection when the authentication token is authenticated by the server before the mobile device first establishes the second connection with the server; and maintaining the authenticated logical first connection between the server and the local network even after the mobile device terminates the second connection.

12. The method of claim 1 wherein the mobile device is provided real time access to the local network by not persistently storing data associated with the transactions in the server.

13. The method of claim 1 wherein the first connection is in a pre-negotiated logical communicative state regardless or whether any connections are established between the server and any mobile device.

14. The method of claim 1 wherein the first connection is a continuously maintained TCP connection.

15. The method of claim 14 further including:

receiving a plurality of independent transactions from a different mobile device; and forwarding each of the plurality of independent transactions from the server to the local network over the continuously maintained TCP connection.

16. The method of claim 15 further including the local network serving files to the server in response to file requests from the server.

17. A method for transferring data between a mobile device and a local network, comprising:

initiating a primary connection from the local network to a management system;

establishing a mobile connection from the mobile device to the management system;

sending transactions between the mobile device and the local network over the primary connection and the mobile connection;

continuously maintaining the primary connection between the local network and the management system after the mobile connection is terminated; and establishing a new mobile connection between the mobile device and the management system and sending transactions between the mobile device and the local network over the new mobile connection and the previously established primary connection;

wherein the primary connection is a continuously maintained communicative logical connection;

storing a representation of data in the local network on the mobile device;

sending a synchronization request from the mobile device to the local network over the mobile connection and the primary connection requesting an updated representation of the data;

sending the updated representation of the data back to the mobile device over the primary first connection and the mobile connection according to the synchronization request;

terminating the mobile connection between the mobile device and the management system;

monitoring the local network for new data associated with a mobile device user;

sending a synchronization trigger over the primary connection from the local network to the management system when the new data is detected;

forwarding the synchronization trigger from the management system to the mobile device; and automatically reestablishing the mobile connection between the mobile device and the management system when the synchronization trigger is received by the mobile device; and sending a synchronization request from the mobile device over the reestablished mobile connection and the primary connection to the local network.

18. A method according to claim 17 including using a notification protocol for forwarding the synchronization trigger to the mobile device.

19. A method according to claim 17 including using a Wireless Application Protocol (WAP) Push or other equivalent notification protocol for forwarding the synchronization trigger to the mobile device.

20. A computer system, comprising:

a server located in a first publicly accessible Internet network that communicates with a local client over a persistent permanent stateful connection initiated by the local client from a second private enterprise network through a firewall that separates the second private enterprise network from the first publicly accessible Internet network;

the server further communicating over a first stateful connection initiated from a mobile device located outside the second private enterprise network over a mobile network and the first publicly accessible Internet network;

the mobile device prevented from directly accessing the second private enterprise network by the firewall and thereby using the server to route transactions between the mobile device and the local client over the first stateful connection and through the firewall using the established persistent permanent stateful connection stateful connection;

the server continuously maintaining the persistent permanent stateful connection independently of the connectivity status of the first stateful connection with the mobile device and regardless of file transaction inactivity between any of the local client, the mobile device and the server so that a connection oriented and stateful communication path between the mobile device and the local client is completed whenever new stateful connections are established between the mobile device and the server.

21. A computer system according to claim 20 including a user database containing user configuration information for a user in the second private enterprise network, the server receiving an authentication token or other identifier from the local client and establishing the persistent permanent stateful connection when the authentication token or other identifier is verified with the user configuration information.

22. A management computer system according to claim 21 wherein the server receives an authentication token or other identifier from the mobile device and establishes the first stateful connection with the mobile device when the authentication token or other identifier is verified with the user configuration information.

23. A management computer system according to claim 20 wherein the server receives a data list from the local client and sends out portions of the data list to the mobile device according to a type of platform used by the mobile device and according to query requests received from the mobile device.

24. A management computer system according to claim 20 wherein the server receives a trigger from the local client and then notifies the mobile device of the trigger.

25. A computer system according to claim 20 including receiving a high priority message from the local client and notifying the mobile device of the high priority message.

26. The computer system of claim 20 wherein the substantially permanent stateful connection is a continuously maintained Transmission Control Protocol (TCP) connection.

27. The computer system of claim 20 wherein the transactions are not persistently stored on the server.

28. The computer system of claim 20 wherein the persistent permanent stateful connection is a layer four connection that sits on top of the Internet Protocol (IP).

29. The computer system of claim 20 wherein state information for the persistent permanent stateful connection is included in packets communicated between the server and the local client.

30. The computer system of claim 20 wherein the first stateful connection is released according to a timeout and the persistent permanent stateful connection is maintained independently of any timeouts.

31. A mobile device located in a mobile network, comprising:

a processor configured to exchange file access transactions with a local client through a constant stateful connection that provides access to an internet that is separated from a publicly addressable network by one or more firewalls, constant stateful connection remaining stateful regardless of whether the processor is actively connected to the mobile network, regardless of how much time passes between any communications amongst any mobile device and any network devices located on the intranet, and regardless of any timeouts so that repetitively established temporary stateful connections between the processor and a server repetitively couple with the constant stateful connection to repetitively complete temporary stateful communication paths between the processor and the local client;

the processor to send a synchronization request from the mobile device over one of the temporary stateful connections and the constant stateful connection to the local network in response to a received synchronization trigger; and the processor to exchange synchronization communications with the local network over the temporary stateful connection and the substantially permanent stateful connection after sending the synchronization request.

32. A mobile device according to claim 31 including memory for storing data received from the local client, the processor sending a synchronization transaction to the local client that enables the local client to send updates to the stored data.

33. A mobile device according to claim 32 wherein the processor automatically connects to the mobile network and sends the synchronization transaction upon receiving a notification.

34. A mobile device according to claim 32 including a battery, the processor sending out the synchronization transaction at different time intervals according to an amount of charge remaining in the battery.

35. A mobile device according to claim 31 wherein the processor receives a first file list from the local client identifying a portion of local files, the processor sending a transaction causing the local client to send a second file list identifying another portion of the local files.

36. A mobile device according to claim 35 wherein the processor automatically stores the first file list in memory and then replaces the first file list in memory with the second file list.

37. The method according to claim 1 including providing real time access to the local network by maintaining the logical first connection between the local network and the server after the second connection is terminated.

38. The mobile device of claim 31 wherein the constant stateful connection is a continuously maintained TCP connection that is established through the one or more firewalls.

39. The mobile device of claim 31 wherein the file access transactions are persistently stored only in the mobile device and at network the intranet where the local client is located.

40. A method for transferring data between a mobile device and a local network, comprising:

initiating a primary connection from the local network to a management system;

establishing a mobile connection from the mobile device to the management system;

sending transactions between the mobile device and the local network over the primary connection and the mobile connection;

maintaining the primary connection between the local network and the management system after the mobile connection is terminated;

sending a synchronization request from the mobile device over a new mobile connection and the previously established primary connection to the local network after receiving a synchronization trigger; and sending transactions between the mobile device and the local network over the new mobile connection and the previously established primary connection.

41. A computer system, comprising:
a computer located in a first local network operating a local client that conducts transactions with a mobile device through a server located in a second publicly accessible network external to the first local network and through a wireless network also operating outside the first local network that connects the mobile device to the server, the local client initiating a logical first connection out through the first local network and through the second publicly accessible network to the server that configures both the computer in the first local network and the server in the publicly accessible network for exchanging transactions between the mobile device and the local client over the logical first connection; and the logical first connection between the computer in the first local network and the server in the second publicly accessible network being continuously held open after the mobile device has terminated all connectivity with the server over the wireless network and providing re-connectivity of the mobile device with the computer in the first local network through the already established logical first connection thereby providing continuous pre-negotiated logical re-connectivity from the mobile device to the computer in the first local network through the logical first connection previously established between the server and the computer in the first local network independently of the mobile device terminating all communications with both the server and the computer in the first local network.

42. A computer system according to claim 41 wherein the local client receives a view transaction from the mobile device over the logical first connection, the local client accessing a user directory and sending a list of data items contained in the user directory back over the logical first connection to the mobile device responsive to the view transaction.

43. A computer system according to claim 41 wherein the local client receives a send transaction from the mobile device over the logical first connection, the local client accessing a local network and creating new message data according to the send transaction.

44. A computer system according to claim 41 wherein the local client receives an update transaction from the mobile device over the logical first connection, the local client accessing a user directory and modifying the identified data item according to the update transaction.

45. A computer system according to claim 41 wherein the local client sends a first list to the mobile device identifying a first portion of the user directory to the mobile device ad sends a second list to the mobile device identifying a second portion of the user directory when another view transaction is received from the mobile device.

46. A computer system according to claim 45 wherein the user directory contains, user document files, user emails, subdirectories, or other data items.

47. A computer system according to claim 42 wherein the local client receives a email transaction from the mobile device containing email message information ad identifying at least one of the data items from the list previously sent to the mobile device, local client attaching the identified data item from the user directory to the email message information and transmitting the email message information to a email address contained in the email message information.

48. The computer system according to claim 41 wherein the local client contains filters that identify events, the local client monitoring one or more user directories for the identified events and sending a trigger to the mobile device when the events are detected in the user directories, the trigger causing the mobile device to establish a mobile connection with the server and initiate a synchronization transaction with the local client.

49. The computer system according to claim 41 including an email server coupled to the computer, the email server containing user directories accessed by the local client according to the transactions received from the mobile device.

50. A computer system according to claim 49 wherein the local client operates on a desktop computer, a mobile computer, the email server, a separate server, or an embedded computing node.

51. The computer system according to claim 41 wherein the continuously held open logical first connection provides continuous synchronization of content between the local network and the mobile device.

52. The computer system according to claim 41 wherein the continuously held open logical first connection provides real time access to the local network by the mobile device.

53. The computer system of claim 41 wherein the continuously held open logical first connection is established over the publicly addressable network through one or more firewalls.

54. The management computer system of claim 41 wherein the continuously held open logical first connection is a Transmission Control Protocol (TCP) connection.

55. The management computer system of claim 41 wherein the transactions are not persistently stored on the server.

* * * * *

UNITED STATES PATENT AND TRADEMARK OFFICE
CERTIFICATE OF CORRECTION

| | | |
|---|---|---|
| PATENT NO. | : 7,139,565 B2 | |
| APPLICATION NO. | : 10/339368 | |
| DATED | : November 21, 2006 | |
| INVENTOR(S) | : Fiatal et al. | |

It is certified that error appears in the above-identified patent and that said Letters Patent is hereby corrected as shown below:

Title page, provide the Related U.S. Application Data as follows:

Item (60) Provisional Application No. 60/346,881, filed on January 8, 2002.
Provisional Application No. 60/403,249, filed on August 12, 2002.

Signed and Sealed this
Twelfth Day of April, 2011

David J. Kappos
*Director of the United States Patent and Trademark Office*